C. B. BRISTOL.

Curry-Combs.

No. 5,840. Reissued April 21, 1874.

Witnesses.
A. J. Tibbits
J. H. Shumway

Charles B. Bristol
Inventor
By Atty.
Thos. P. Earle

AM. PHOTO-LITHOGRAPHIC CO. N. Y. (OSBORNE'S PROCESS)

UNITED STATES PATENT OFFICE.

CHARLES B. BRISTOL, OF NEW HAVEN, CONNECTICUT.

IMPROVEMENT IN CURRY-COMBS.

Specification forming part of Letters Patent No. 41,755, dated March 1, 1864; reissue No. 5,840, dated April 21, 1874; application filed January 7, 1874.

*To all whom it may concern:*

Be it known that I, CHARLES B. BRISTOL, of New Haven, in the county of New Haven and State of Connecticut, have invented a new Improvement in Curry-Combs; and I do hereby declare the following, when taken in connection with the accompanying drawings and the letters of reference marked thereon, to be a full, clear, and exact description of the same, and which said drawings constitute part of this specification, and represent, in—

Figure 1:
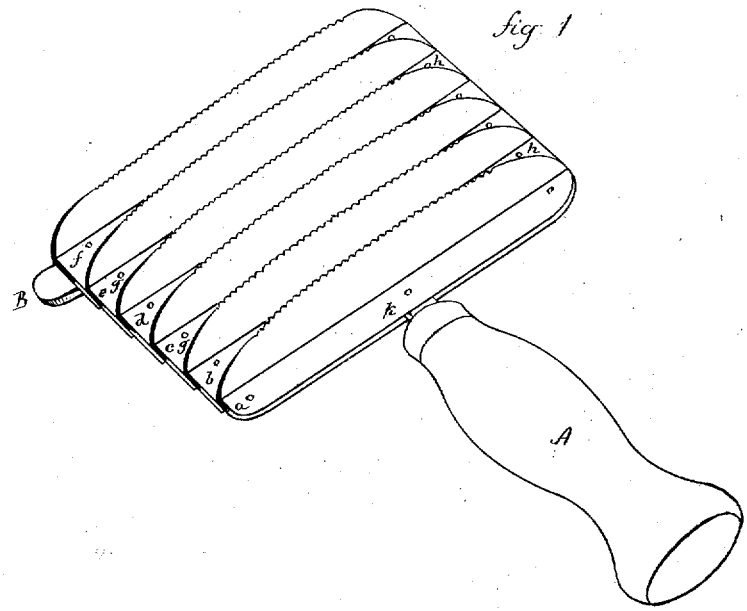
Figure 2:
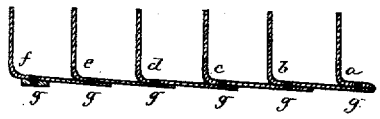
Figure 3:
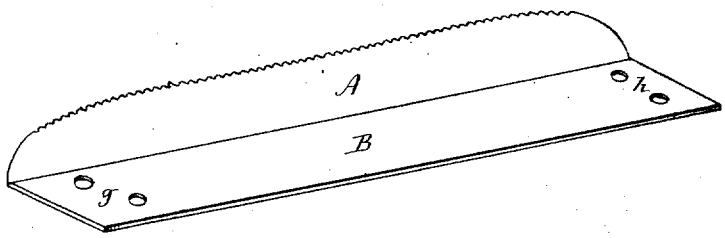

Figure 1, a perspective view inverted; Fig. 2, a transverse section; and in Fig. 3, a perspective view of one of the sections detached, inverted, full size.

This invention relates to an improvement in curry-combs; and it consists in forming the comb from a series of longitudinal sections of sheet metal, bent longitudinally at right angles, or nearly so, and these sections secured together, so that one side of each section from the angle forms a part of the body, and the other side turned down, and the edge serrated or toothed or not, as the case may be.

The sections are made from strips of sheet metal, bent longitudinally about midway of their width, so as to form the two sides A B at nearly right angles to each other. Several such sections are arranged together, so that one side B of each forms part of the body, and the other side turns down, as seen in Fig. 2. The several sections are secured together to complete the comb—here represented as the side B of each section overlapping the next section, and riveted thereto. The edges of the sides A are formed in the usual manner, and the comb provided with the handle C and projection D, upon which to strike to clear the comb.

What I claim as my invention is—

A curry-comb consisting of sections, each bent longitudinally to form two sides, A B, at nearly right angles to each other, and the said sections secured together, each of the sides B forming part of the body, and the sides A turned downward, substantially as described.

CHAS. B. BRISTOL.

Witnesses:

A. J. TIBBITS,

J. H. SHUMWAY.